(12) United States Patent
Choi et al.

(10) Patent No.: US 10,473,879 B2
(45) Date of Patent: Nov. 12, 2019

(54) LENS MODULE AND CAMERA MODULE INCLUDING SAME

(71) Applicant: SAMSUNG ELECTRO-MECHANICS CO., LTD., Suwon-si (KR)

(72) Inventors: Tae Su Choi, Suwon-si (KR); Jong Ho Ahn, Suwon-si (KR); Young Suk Kang, Suwon-si (KR); Jae Won Kwak, Suwon-si (KR); Min Su Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/581,288

(22) Filed: Apr. 28, 2017

(65) Prior Publication Data

US 2018/0031798 A1 Feb. 1, 2018

(30) Foreign Application Priority Data

Aug. 1, 2016 (KR) .......................... 10-2016-0098202
Nov. 25, 2016 (KR) .......................... 10-2016-0158171

(51) Int. Cl.
*G02B 7/02* (2006.01)
*G02B 27/00* (2006.01)

(52) U.S. Cl.
CPC ......... *G02B 7/021* (2013.01); *G02B 27/0018* (2013.01)

(58) Field of Classification Search
CPC .................................... G02B 7/00; G02B 7/02
USPC .................................................. 359/811, 819
See application file for complete search history.

(56) References Cited

U.S. PATENT DOCUMENTS

| 7,419,315 B2 | 9/2008 | Hirata et al. | |
| 2006/0158748 A1* | 7/2006 | Hirata | G02B 7/021 |
| | | | 359/811 |
| 2006/0274436 A1* | 12/2006 | Inamoto | G02B 7/023 |
| | | | 359/819 |
| 2007/0291386 A1* | 12/2007 | Yoshikawa | G02B 1/11 |
| | | | 359/885 |
| 2008/0158697 A1* | 7/2008 | Ho | G02B 7/021 |
| | | | 359/811 |
| 2015/0253569 A1* | 9/2015 | Lin | G02B 27/0018 |
| | | | 359/503 |
| 2018/0031798 A1 | 2/2018 | Choi et al. | |
| 2018/0372983 A1* | 12/2018 | Shimizu | G02B 7/021 |

FOREIGN PATENT DOCUMENTS

| CN | 1808201 A | 7/2006 |
| CN | 102928946 A | 2/2013 |
| CN | 207164335 U | 3/2018 |
| JP | 3-271708 A | 12/1991 |

(Continued)

OTHER PUBLICATIONS

Korean Office Action dated Apr. 25, 2018, in corresponding Korean Application No. 10-2016-0158171 (5 pages in English, 5 pages in Korean).

(Continued)

*Primary Examiner* — William Choi
(74) *Attorney, Agent, or Firm* — NSIP Law

(57) ABSTRACT

A lens module includes a lens and a lens barrel accommodating the lens. A distance between an internal surface of the lens barrel and an optical axis varies in a circumferential direction of the lens barrel.

15 Claims, 7 Drawing Sheets

(56) References Cited

FOREIGN PATENT DOCUMENTS

| | | |
|---|---|---|
| JP | 2011-107245 A | 6/2011 |
| JP | 2014-232132 A | 12/2014 |
| KR | 10-2014-0106317 A | 9/2014 |
| KR | 10-2016-0076712 A | 7/2016 |

OTHER PUBLICATIONS

Korean Office Action dated Sep. 19, 2017, in corresponding Korean Application No. 10-2016-0158171 (5 pages in English, 5 pages in Korean).
Chinese Office Action dated Sep. 2, 2019 in corresponding Chinese Patent Application No. 201710522217.2 (14 pages in English, 9 pages in Chinese).

* cited by examiner

LENS MODULE AND CAMERA MODULE INCLUDING SAME

CROSS-REFERENCE TO RELATED APPLICATION(S)

This application claims the benefit under 35 U.S.C. § 119(a) of Korean Patent Application Nos. 10-2016-0098202, filed on Aug. 1, 2016, and 10-2016-0158171, filed on Nov. 25, 2016 in the Korean Intellectual Property Office, the entire disclosures of which are incorporated herein by reference for all purposes.

BACKGROUND

1. Field

The following description relates to a lens module and a camera module including the same.

2. Description of Related Art

Recently, camera modules have been installed as a common practice in mobile communications terminals, such as in smartphones. Camera modules are provided with a plurality of lenses, and light passing through the lenses is collected by image sensors to form images. Light reflected from a subject and incident to the interior of a camera module may be refracted through a plurality of lenses. The refracted light may be reflected from internal surfaces of lens barrels of the camera modules. When reflected light is incident on image sensors, a flare phenomenon occurs.

As a result of the flare phenomenon, a captured image may be blurred or exhibit round white spots, so that the quality of the captured image is degraded. In particular, with the recent trend for miniaturization, respective components of camera modules are reduced in size. Accordingly, the frequency at which light is unintentionally reflected in camera modules has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a lens and a lens barrel accommodating the lens. A distance between an internal surface of the lens barrel and an optical axis varies in a circumferential direction of the lens barrel.

A portion of the internal surface of the lens barrel of the lens module may have an unevenness pattern. A protruding portion can be formed on a portion of the internal surface of the lens barrel of the lens module. The protruding portion also can have a length in a direction of the optical axis and protrude toward the optical axis. A surface of the protruding portion of the lens module may have a curvature.

The lens module may have a plurality of protruding portions, formed in the circumferential direction. The lens module can have edge portions respectively formed between protruding portions of the plurality of protruding portions. The lens module may have a lens barrel that accommodates a plurality of lenses, and the protruding portion may be formed on the portion of the internal surface of the lens barrel adjacent to a lens closest to an image side among the plurality of lenses. The lens module can have a lens barrel that accommodates a plurality of lenses, and the protruding portion can be formed on the portion of the internal surface of the lens barrel disposed between respective lenses of the plurality of lenses.

Protruding portions and recessed portions may be alternately formed on the internal surface of the lens barrel in the circumferential direction, where the protruding portions may protrude toward the optical axis and the recessed portions may be concave away from the optical axis. The protruding portions and the recessed portions can have a length in the direction of the optical axis, where a width of the protruding portions can be wider than a width of the recessed portions. The surfaces of each of the protruding portions and the recessed portions may be curved surfaces having respective curvatures. The curvature of the respective surfaces of the protruding portions can be less than the curvature of the respective surfaces of the recessed portions.

The protruding portions and the recessed portions may have inflection points formed in locations in which the protruding portions and the recessed portions are connected to each other. When a distance is defined as a width of the protruding portion, which is a distance between the inflection points formed on both sides of each of the protruding portions of the lens module, and a distance is defined as a width of the recessed portions, which is the distance between the inflection points formed on both sides of each of the recessed portions, the width of the protruding portions can be wider than the width of the recessed portions. A distance between the internal surface of the lens barrel and the optical axis may repeatedly vary in the circumferential direction.

In another general aspect, a camera module includes a housing having a lens barrel, where the lens barrel accommodates a lens, and an image sensor module coupled to the housing. Protruding portions are formed on an internal surface of the lens barrel in a circumferential direction, and the protruding portions have a length in a direction of an optical axis.

In another general aspect, a lens barrel includes an outer circumference having a constant radius in relation to a point on an optical axis. The optical axis is an axis through the center of the barrel. The lens barrel also includes an inner circumference having a varying radius in relation to the point on the optical axis. The lens barrel is configured to accommodate a lens.

The lens barrel may have a varying radius of the inner circumference, which repeats from a maximum distance from the optical axis to a minimum distance from the optical axis in a repeating pattern. The repeating pattern can be any one or any combination of a sawtooth pattern, a serrated pattern, and/or a concavo-convex pattern. The lens barrel may also include a step-wise series of inner circumferences configured to accommodate lenses of differing diameters at various points along a length of the lens barrel.

Other features and aspects will be apparent from the following detailed description, the drawings, and the claims.

Figure 1:
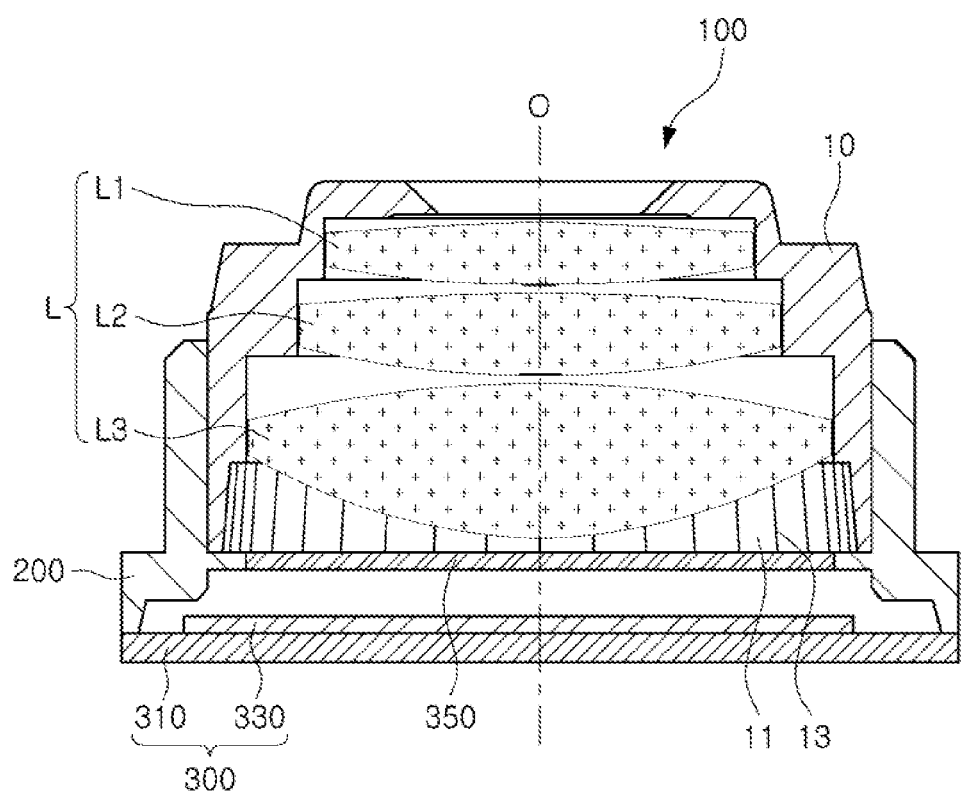
FIG. 1 is a cross-sectional view of a camera module according to an example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed as will be apparent after an understanding of the disclosure, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the application.

Throughout the specification, it will be understood that when an element, such as a layer or region, is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide a lens module which may prevent light incident to an interior of the module from being reflected from an internal surface thereof, causing a flare phenomenon. Subsequently, examples are described in further detail with reference to the accompanying drawings. Hereinafter, an optical axis direction refers to a longitudinal direction, based on a lens barrel 10, while a circumferential direction refers to a clockwise or counterclockwise direction of the lens barrel 10.

FIG. 1 is a cross-sectional view of a camera module according to an example. Referring to FIG. 1, a camera module according to an example includes a lens module 100, a housing 200, and an image sensor module 300. The housing 200 accommodates the lens module 100.

In one example, housing 200 has an open upper portion and an open lower portion, and accommodates lens module 100 therein. Housing 200 has image sensor module 300 disposed therebelow. Image sensor unit 300 is provided as a device that converts light incident in lens module 100 into an electrical signal.

In one example, image sensor module 300 includes a printed circuit board 310, an image sensor 330 connected to printed circuit board 310, and an infrared filter 350. Infrared filter 350 blocks light in an infrared region from light incident to lens module 100. Image sensor 330 converts light incident to lens module 100 into an electrical signal.

In one example, image sensor 330 is a charge coupled device (CCD) or a complementary metal-oxide semiconductor (CMOS). An electrical signal, converted by image sensor 330, may be displayed as an image on a display of a portable electronic device. Image sensor 330 is fixed to printed circuit board 310, and is electrically connected to printed circuit board 310, using wire bonding.

Lens module 100 includes lens barrel 10, and a plurality of lenses L disposed in lens barrel 10. Lens barrel 10 has a cylindrical shape, so that at least one of the lenses L for imaging a subject may be received therein. The at least one lens L is disposed in lens barrel 10 on an optical axis O. The at least one lens L includes an optical portion and a flange portion. The optical portion refracts light reflected from the subject, and the flange portion fixes a lens to lens barrel 10.

When a plurality of lenses L are provided in lens barrel 10, the plurality of lenses L have different diameters, and lens barrel 10 has an internal surface formed to have step portions, so as to receive the plurality of lenses L having various diameters. In one example, lens barrel 10 has internal diameters having various sizes. Referring to FIG. 1, this example illustrates three lenses L1, L2, and L3 disposed sequentially from a lens closest to a subject to a lens on an image side, but the present disclosure is not limited to the number of lenses. For example, lens module 100 includes five or less lenses or five or more lenses, depending on target resolution to be realized.

The lens L is sequentially stacked in lens barrel 10, and a spacer is disposed between the lens L to maintain an interval between the lens L and block unnecessary light. The spacer is coated with a light shielding material or has a light shielding film attached, so as to block unnecessary light. The spacer is formed of an opaque material.

For example, the spacer is formed of a nonferrous metal, such as copper or aluminum. Light, reflected from the subject and incident to an interior of the lens barrel 10, is refracted through lens L. Here, the refracted light is reflected from the internal surface of lens barrel 10. When such reflected light is incident on image sensor 330, a flare phenomenon occurs. When the flare phenomenon occurs, a captured image may be blurred or may exhibit round white spots, so that the quality of the captured image is degraded.

In one example, lens module 100 according to an example may be configured such that a distance between the internal surface of lens barrel 10 and the optical axis O may vary in the circumferential direction. Thus, the internal surface of lens barrel 10 may be configured, such that an angle of reflection of light varies, according to reflected locations of the light, when light is reflected from the internal surface of lens barrel 10.

At least a portion of the internal surface of lens barrel 10 has a convex pattern and a concave pattern repeatedly formed thereon in the circumferential direction. For example, lens barrel 10 has a plurality of protruding portions 11 formed thereon in the circumferential direction. The protruding portions protrude toward optical axis O. Each of protruding portions 11 has a length in an optical axis direction, and a surface of each protruding portion 11 may be a curved surface, having a curvature. Each protruding portion 11, having a convex curved surface, is formed in the circumferential direction, so that a respective edge portion 13 is formed between respective protruding portions 11.

Figure 5A:
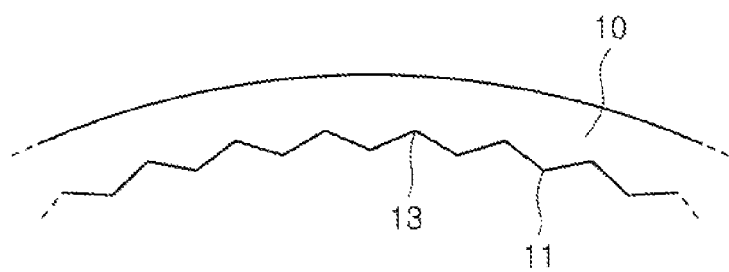
FIGS. 5A, 5B, and 5C are modifications of shapes of a plurality of protruding portions and a plurality of edge portions provided on an internal surface of a lens barrel according to an example.
Figure 5B:
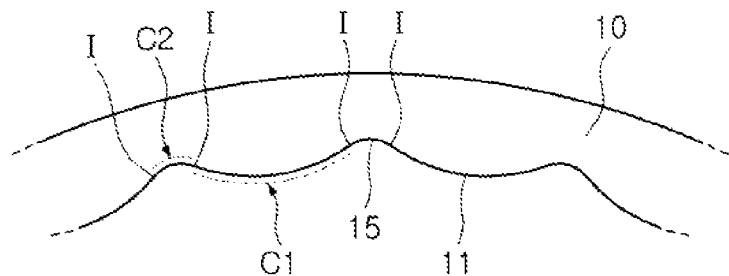
Figure 5C:
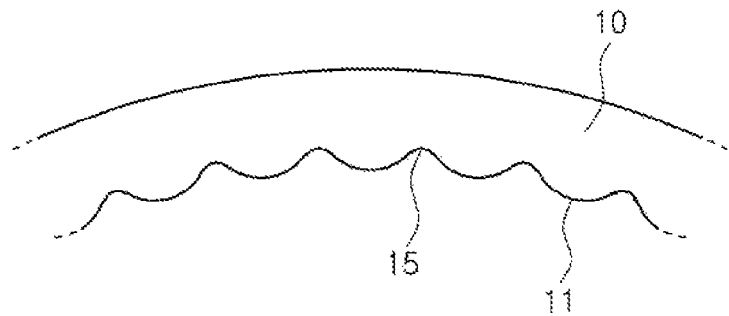

In another example, protruding portions 11, protruding toward an optical axis O, and recessed portions 15, formed to be concave in a direction away from the optical axis O, are alternately formed on an internal surface of a lens barrel 10 (refer to FIGS. 5B and 5C). Protruding portions 11 and recessed portions 15 are provided as a plurality of protruding portions 11 and a plurality of recessed portions 15, respectively. Accordingly, the convex pattern and the concave pattern are repeatedly formed on at least a portion of the internal surface of lens barrel 10 in a circumferential direction.

The at least a portion of the internal surface of lens barrel 10 has an unevenness pattern. Thus, when light is reflected from the internal surface of lens barrel 10, an angle of reflection of the light may vary, according to reflected locations of the light. As a result, light reflected from the internal surface of lens barrel 10 may be scattered, which prevents a flare phenomenon from occurring due to unintentionally reflected light generated in lens barrel 10.

Figure 2:
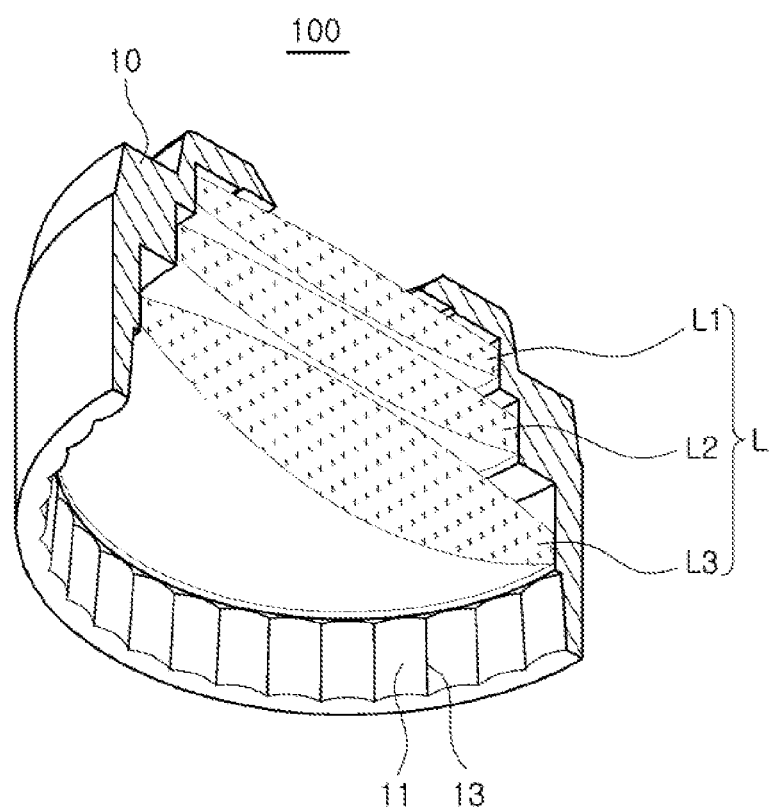
FIG. 2 is a cut-away perspective view of a lens barrel according to an example.
Figure 3:
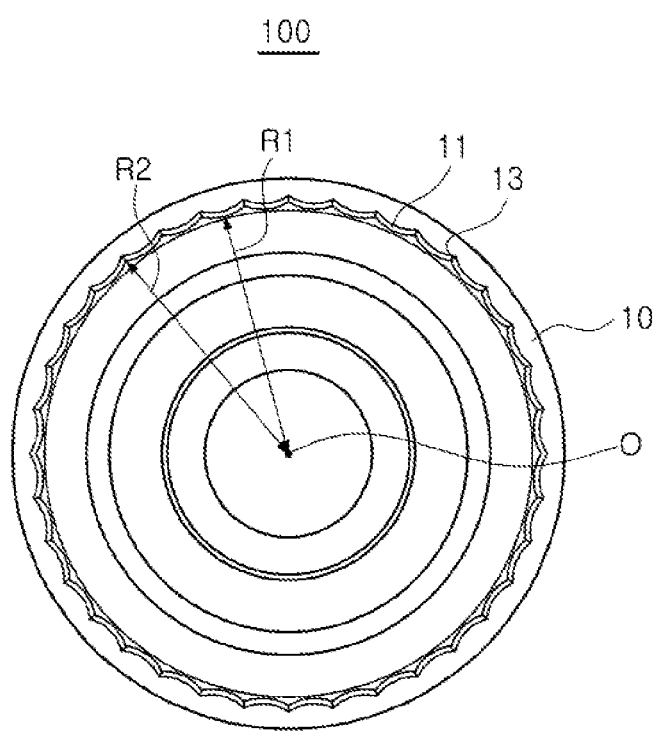
FIG. 3 is a rear view of a lens barrel according to an example.
Figure 4A:
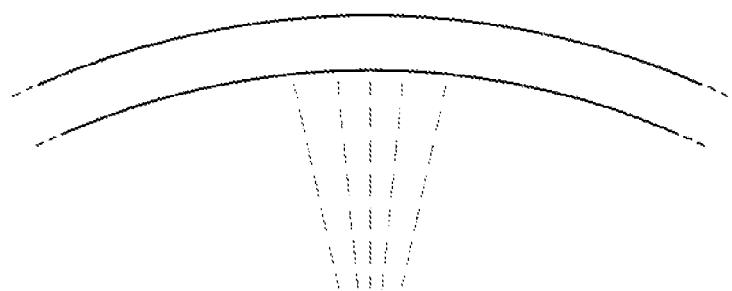
FIGS. 4A and 4B are views illustrating light reflected from an internal surface of a lens barrel.
Figure 4B:
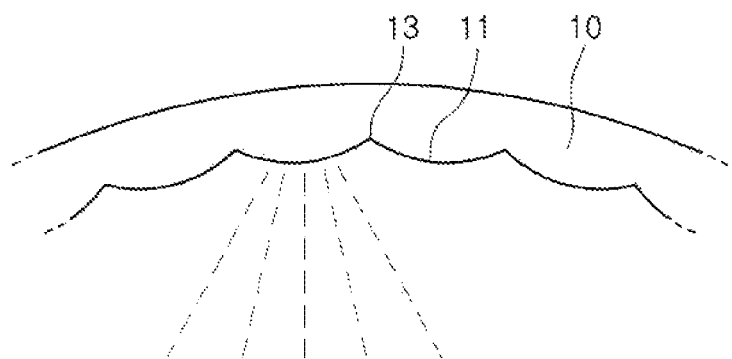

FIG. 2 is a cut-away perspective view of a lens barrel according to an example. FIG. 3 is a rear view of a lens barrel according to an example. FIGS. 4A and 4B are views illustrating light reflected from an internal surface of a lens barrel. Referring to FIGS. 2 and 3, the at least a portion of the internal surface of lens barrel 10 has an internal diameter, varying in the circumferential direction of lens barrel 10, so that light reflected from the internal surface of lens barrel 10 is scattered.

In one example, the at least a portion of the internal surface of lens barrel 10 is configured such that the distance between the internal surface of lens barrel 10 and optical axis O vary in the circumferential direction. At least a portion of the internal surface of lens barrel 10 has a convex pattern and a concave pattern repeatedly formed thereon in the circumferential direction. Thus, the distance between the internal surface of lens barrel 10 and optical axis O may vary repeatedly in the circumferential direction.

A distance R1 between a convex portion of the internal surface of lens barrel 10 and optical axis O, and a distance R2 between a concave portion of the internal surface of lens barrel 10 and optical axis O, are different from each other. In one example, distance R1 between the convex portion of the internal surface of lens barrel 10 and optical axis O is less than distance R2 between the concave portion of the internal surface of lens barrel 10 and optical axis O.

Protruding portions 11 are formed on the internal surface of lens barrel 10, and each respective pair of protruding portions 11 have a respective edge portion 13 formed therebetween. The convex portion of the internal surface of lens barrel 10 is a portion in which protruding portion 11 is formed, and the concave portion of the internal surface of lens barrel 10 is a portion in which edge portion 13 is formed. Protruding portion 11 and edge portion 13 are alternately disposed on the internal surface of lens barrel 10 in the circumferential direction. Thus, the internal surface of the lens barrel 10 may have the unevenness pattern formed in the circumferential direction by protruding portion 11 and edge portion 13.

Further, each of protruding portion 11 and edge portion 13 may have a length in the optical axis direction. FIGS. 1 through 4 illustrate edge portion 13 as being formed in a single line form, edge portion 13 having the length in the optical axis direction. In a different manner, edge portion 13 also has a length in the optical axis direction and a width in a direction perpendicular to the optical axis. A width of protruding portion 11 may be wider than that of edge portion 13.

Protruding portion 11 and edge portion 13 are formed on the internal surface of lens barrel 10 adjacent to a lens L3 closest to the image sensor 330 of lenses L or the image side. In one example, protruding portion 11 and edge portion 13 are formed on a portion of lens barrel 10, of which the internal diameter is significantly increased.

As illustrated in FIG. 4A, when lens barrel 10 has a constant internal diameter in a certain location on the internal surface thereof, light reflected from the internal surface of lens barrel 10 is focused on any one point. For example, when reflected light is incident on image sensor 330, the reflected light is focused on any one point of image sensor 330, resulting in a flare phenomenon.

As illustrated in FIG. 4B, when the internal diameter of lens barrel 10 varies in the circumferential direction, light reflected from the internal surface of lens barrel 10 is scattered. Thus, even when light is reflected from the internal surface of lens barrel 10, a flare phenomenon is prevented.

For example, lens module 100 according to an example allows light, reflected from the internal surface of lens barrel 10 to be scattered in all directions, without being focused on any one point. Thus, even when light passing through lens L is reflected from the internal surface of lens barrel 10, lens module 100 according to an example may prevent the flare phenomenon. As a result, the quality of a captured image may be increased.

The lens L is inserted into and fixed to the interior of lens barrel 10, and an adhesive is applied to the internal surface of lens barrel 10 to increase fixing power of the lens L. As described above, when lens L is bonded to the internal surface of lens barrel 10 by the adhesive, protruding portion 11 and edge portion 13 may increase a contact area between the lens L and the adhesive, and thus, the lens L may be more strongly bonded to the internal surface of the lens barrel 10.

FIGS. 5A, 5B, and 5C are modifications of shapes of a plurality of protruding portions and a plurality of edge portions provided on an internal surface of a lens barrel, according to examples. Referring to FIGS. 5A, 5B, and 5C, shapes of protruding portion 11 and edge portion 13 scatter light, so that reflected light is not focused on any one point. In one example, as illustrated in FIG. 5A, protruding portion 11 and edge portion 13 are pointed. Alternatively, as illustrated in FIGS. 5B and 5C, protruding portion 11, protruding toward optical axis O, and recessed portion 15, formed to be concave away from optical axis O, are alternately formed on the internal surface of lens barrel 10 in the circumferential direction. Protruding portion 11 and recessed portion 15 are provided as a plurality of protruding portions 11 and a plurality of recessed portions 15, respectively. Accordingly, at least a portion of the internal surface of lens barrel 10 has the convex pattern and the concave pattern repeatedly formed thereon in the circumferential direction.

At least one of surfaces of protruding portion 11 and recessed portion 15 is a curved surface, having a degree of curvature. When the surface of protruding portion 11 and recessed portion 15 is a curved surface, having a curvature, an inflection point I is formed on a portion, in which protruding portion 11 and recessed portion 15 are connected to each other, of the internal surface of lens barrel 10. Here, inflection point I refers to a point at which the convex portion changes to the concave portion of the internal surface of lens barrel 10, or a point at which the concave portion changes to the convex portion.

A curvature C1 of the convex portion (for example, a portion of the internal surface on which protruding portion 11 is formed) is different from a curvature C2 of the concave portion (for example, a portion of the internal surface on which recessed portion 15 is formed). For example, curvature C1 of the convex portion in which protruding portion 11 is formed is less than curvature C2 of the concave portion in which recessed portion 15 is formed. Thus, a width of protruding portion 11 may be wider than that of recessed portion 15. Used in this sense, the width refers to a distance between inflection points I.

For example, when a distance between inflection points I, formed on both sides of protruding portion 11, is defined as the width of protruding portion 11, and a distance between inflection points I, formed on both sides of recessed portion 15, is defined as the width of recessed portion 15, the width of protruding portion 11 is wider than that of recessed portion 15. The width of protruding portion 11 may be formed to be wider than that of recessed portion 15. Thus, a function of scattering reflected light may be significantly increased.

Figure 6:
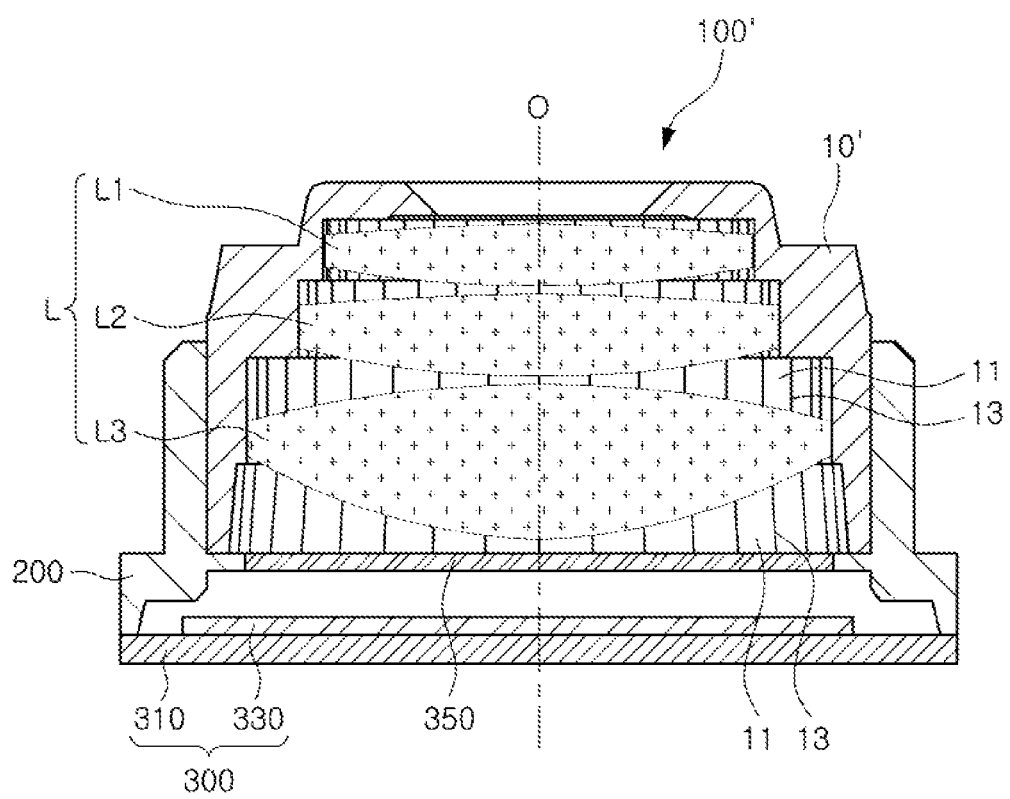
FIG. 6 is a cross-sectional view of a camera module according to another example.
Figure 7:
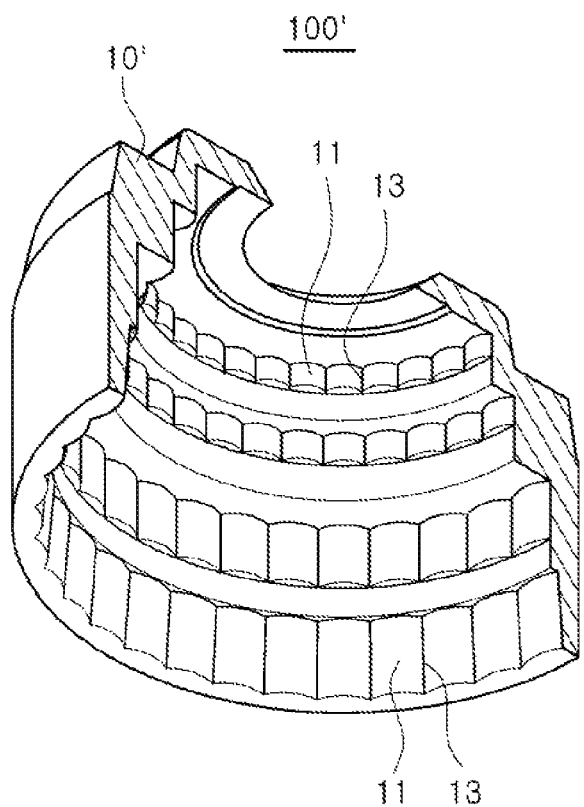
FIG. 7 is a cut-away perspective view of a lens barrel according to another example.

FIG. 6 is a cross-sectional view of a camera module according to another example. FIG. 7 is a cut-away perspective view of a lens barrel according to another example. As illustrated in the examples of FIGS. 1 through 5, protruding portion 11, edge portion 13, or recessed portion 15 are formed on the portion of the internal surface of lens barrel 10 adjacent to lens L3 closest to image sensor 330 of lens L or the image side. However, as illustrated in the examples of FIGS. 6 and 7, a plurality of protruding portions 11, a plurality of edge portions 13, or a plurality of recessed portions 15 are also formed on a portion of an internal surface of a lens barrel 10' disposed between a plurality of lenses L. For example, as illustrated in FIGS. 6 and 7, a lens module 100' according to another example has protruding portion 11, edge portion 13, or recessed portion 15 formed on a portion of the internal surface of lens barrel 10', to which a lens L is not bonded.

As set forth above, according to the examples, a lens module prevents light incident to an interior thereof from being reflected from an internal surface thereof, causing a flare phenomenon. While this disclosure includes specific examples, it will be apparent after an understanding of the application that various changes in form and details may be made in these examples without departing from the spirit and scope of the claims and their equivalents. The examples described herein are to be considered in a descriptive sense only, and not for purposes of limitation.

Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
    a lens; and
    a lens barrel accommodating the lens,
    wherein an internal surface of the lens barrel has a plurality of protruding portions, each of the plurality of protruding portions having a curved surface, and
    wherein the plurality of protruding portions are not in contact with the lens,
    wherein the protruding portions and recessed portions are alternately formed on the internal surface of the lens barrel in a circumferential direction,
    wherein each of the protruding portions has a convex surface having curvature,
    wherein each of the recessed portions has a concave surface having curvature, and
    wherein the respective curvature of the surfaces of the protruding portions is less than the respective curvature of the surfaces of the recessed portions.

2. The lens module of claim 1, wherein a portion of the internal surface of the lens barrel has an unevenness pattern.

3. The lens module of claim 1,
    wherein each of the protruding portions has a length in a direction of an optical axis and protrudes toward the optical axis.

4. The lens module of claim 3, wherein the lens barrel accommodates a plurality of lenses, and the protruding portions are formed on the portion of the internal surface of the lens barrel, adjacent to a lens closest to an image side among the plurality of lenses.

5. The lens module of claim 3, wherein the lens barrel accommodates a plurality of lenses, and the protruding portions are formed on the portion of the internal surface of the lens barrel disposed between respective lenses of the plurality of lenses.

6. The lens module of claim 1, wherein each of the protruding portions and the recessed portions has a length in the direction of the optical axis, and a width of the protruding portions is wider than a width of the recessed portions.

7. The lens module of claim 1, wherein the protruding portions and the recessed portions have inflection points formed in locations in which the protruding portions and the recessed portions are connected to each other.

8. The lens module of claim 7, wherein a width of the protruding portions is wider than a width of the recessed portions, wherein a distance between inflection points formed on both sides of each of the protruding portions is defined as a width of the protruding portion, and a distance between inflection points formed on both sides of each of the recessed portions is defined as a width of the recessed portions.

9. The lens module of claim 1, wherein a distance between the internal surface of the lens barrel and an optical axis repeatedly varies in the circumferential direction.

10. The lens module of claim 1, wherein a width of the curved surface of each of the protruding portions is greater than a width of curved surfaces of recessed portions formed on the internal surface of the lens barrel.

11. A camera module comprising:
a housing comprising a lens barrel, the lens barrel accommodating a lens; and
an image sensor module coupled to the housing,
wherein a plurality of protruding portions, each having a convex surface, are formed on an internal surface of the lens barrel in a circumferential direction,
wherein a plurality of recessed portions, each having a concave surface, are respectively formed between the protruding portions of the plurality of protruding portions,
wherein a respective curvature of the surfaces of the protruding portions is less than a respective curvature of the surfaces of the recessed portions,
wherein the plurality of protruding portions protrude in a direction of an optical axis, and
wherein the plurality of protruding portions are not in contact with the lens.

12. A lens barrel, comprising:
an outer circumference having a radius in relation to a point on an optical axis, wherein the optical axis is an axis through the center of the barrel; and
an inner circumference having a varying radius in relation to the point on the optical axis,
wherein the lens barrel is configured to accommodate a lens,
wherein the lens barrel has a plurality of protruding portions, each of the plurality of protruding portions having a convex surface,
wherein the plurality of protruding portions are not in contact with the lens,
wherein the lens barrel has a plurality of recessed portions, each of the plurality of recessed portions having a concave surface, and
wherein a respective curvature of the surfaces of the protruding portions is less than a respective curvature of the surfaces of the recessed portions.

13. The lens barrel of claim 12, wherein the varying radius of the inner circumference repeats from a maximum distance from the optical axis to a minimum distance from the optical axis in a repeating pattern.

14. The lens barrel of claim 13, wherein the repeating pattern is any one or any combination of a sawtooth pattern, a serrated pattern, and/or a concavo-convex pattern.

15. The lens barrel of claim 12 further comprising:
step-wise variations of the inner circumference of the lens barrel configured to accommodate lenses of differing diameters at step-wise points along a length of the lens barrel.

* * * * *